United States Patent
Gebara et al.

(10) Patent No.: US 8,220,783 B2
(45) Date of Patent: Jul. 17, 2012

(54) INSULATING COVER FOR STEAM DISCHARGE TUBES

(75) Inventors: Omar George Gebara, Ottawa (CA); Antoni Stanley Sieklicki, Ottawa (CA)

(73) Assignee: Walter Meier (Climate Canada) Ltd., Ottawa, Ontario (CA)

( * ) Notice: Subject to any disclaimer, the term of this patent is extended or adjusted under 35 U.S.C. 154(b) by 420 days.

(21) Appl. No.: 12/499,508

(22) Filed: Jul. 8, 2009

(65) Prior Publication Data
US 2010/0047607 A1   Feb. 25, 2010

(30) Foreign Application Priority Data
Aug. 25, 2008  (CA) ..................................... 2639116

(51) Int. Cl.
*B01F 3/04* (2006.01)
(52) U.S. Cl. ........................ 261/118; 428/595
(58) Field of Classification Search .................. 261/118; 428/595
See application file for complete search history.

(56) References Cited

U.S. PATENT DOCUMENTS
3,857,514 A * 12/1974 Clifton ........................... 239/132
2008/0061455 A1   3/2008  Lundgreen et al.
* cited by examiner

*Primary Examiner* — Robert A Hopkins
(74) *Attorney, Agent, or Firm* — Perley Robertson Hill & McDougall LLP

(57) ABSTRACT

An insulator for use with a steam discharge tube of the type having two parallel rows of oppositely facing steam discharge apertures is disclosed. Two elongate channel sections having elongate channel edges are positioned transversely between the two rows and extend longitudinally along the tube on opposite sides of the tube. Sealing and spacing means serves to seal in spaced apart relationship the channel sections from the tube on respective opposite sides of the tube and provision is also made for securing said sections to the tube when in their desired location. The resultant insulator in assembled form reduces unwanted condensation production from the steam discharge orifices and also due to no use or the reduced use of polymers, the generation of unwanted off-gases.

16 Claims, 5 Drawing Sheets

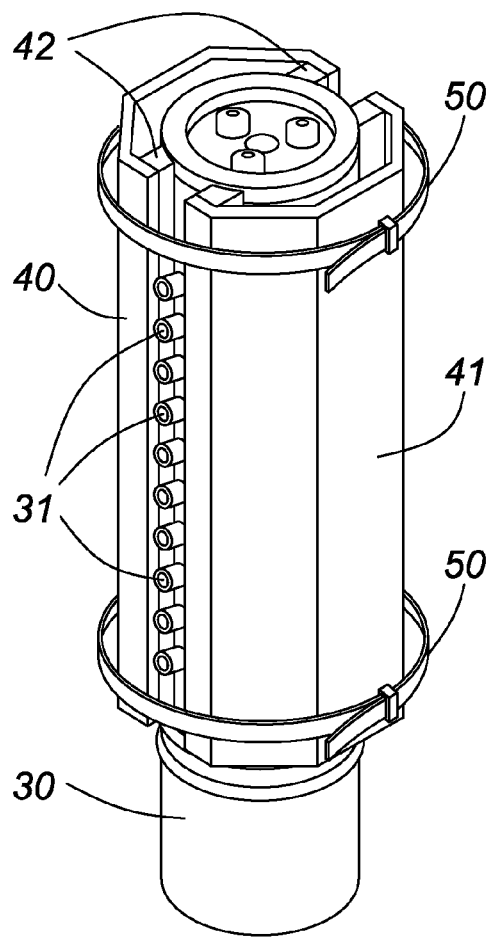 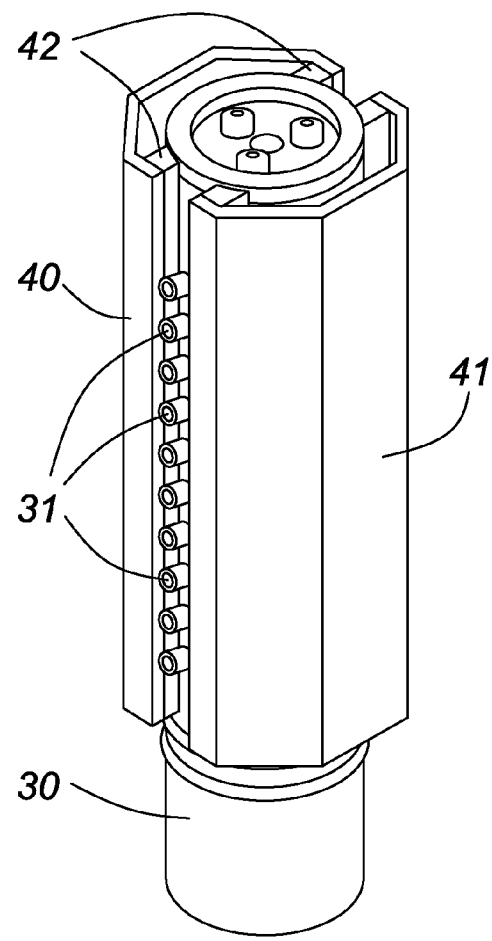
FIG. 5  FIG. 6

INSULATING COVER FOR STEAM DISCHARGE TUBES

FIELD OF THE INVENTION

This invention relates to a novel type of insulator or insulating cover which is intended for use in association with steam humidification equipment and more particularly, steam dispersion or discharge tubes in order to control or minimise the production of unwanted condensate produced during the dispersion of steam from the discharge tubes.

BACKGROUND OF THE INVENTION

The advantages of insulating steam discharge tubes in steam dispersion systems is discussed in detail in, inter alia, US Patent Publication US 2008/0061455/Lundgreen et al. published Mar. 13, 2008 and wherein insulating the steam discharge tube with a covering of polyvinylidene fluoride (PDVF) is disclosed and which has been found effective in reducing condensate and heat gain.

Also well known in the HVAC field is the insulation of pipes and tubes employing a filler material and metal cladding around it with the filler material typically being fibrous or a foam based polymer. However, in HVAC applications, the insulation material is generally considered unsafe for plenum use as it either sheds material or outgases. Further, this type of material cannot be easily manipulated into small areas and to be effective, it must be of a minimum thickness and can result in an enlarged cross-sectional area which contributes to higher air flow drag.

An additional drawback associated with foam insulation when used in association with pipes and tubing is that it is susceptible to damage from handling and age, and can be subject to contamination.

SUMMARY OF THE INVENTION

The insulator or insulating cover of this invention is intended to be used on steam dispersion tubes commonly forming part of a steam dispersion system. Since the insulator is of modular design, this facilitates, when necessary, its repair, removal, re-application or re-application with a different design or different material. Further, since the novel insulator design relies on no or only minor polymer use, and preferably its major component is fabricated from pre-formed metal channel sections functioning as shields, cladding or jacketing for the steam discharge tubes, increased costs normally associated with plenum-safe materials are minimised.

The insulator itself is relatively robust and not likely to be damaged during assembly, transportation or use. Additionally, due to its novel form of construction, the insulator can be retrofitted in the field on existing steam dispersion systems having non-insulated steam dispersion tubes.

The novel insulator of this invention, which is intended for use with steam discharge tubes of the type which each have two parallel rows of oppositely facing steam discharge apertures which extend along the tube, is made up from two elongate channel sections, functioning as thermal shields, with each having two elongate channel edges. The channel sections are each dimensioned so as to transversely extend between the two rows of apertures and to extend longitudinally along the tube on opposite sides thereof.

Also provided with the insulator are sealing and spacing means, preferably in the form of sealing strips, for sealing in spaced apart relationship the interior of each of said channel sections along its channel edges to respective opposite sides of the tube. When the channel sections are in their desired position on the tube and also in a sealed and spaced apart relationship with the tube, they can be secured in position employing any suitable securing means, such as at least two spaced apart tie down straps. Alternatively, and if desired, the sealing strips can themselves function as the securing means by applying a suitable adhesive to either side of the strip in a manner well known in the art.

The sealing and spacing means advantageously can comprise two elongate sealing strips which can either be attached to the interior of each of the U-shaped channel sections along the channel edges or attached to the tube on adjacent opposite sides of each of the two rows of steam discharge apertures.

Alternatively, the sealing and spacing means, if desired, can be constructed from two elongate sealing strips, each having a row of perforations extending therethrough and which are dimensioned and spaced apart one from another so as to extend along and surround the apertures in each of the two rows of steam discharge apertures.

From the foregoing, each channel section which is longitudinally sealed in spaced apart relationship to the steam discharge tube along its longitudinal edges causes an air gap to be created between the channel section or shield and the sidewall of the tube. This air gap is the primary isolative body and preferably has a gap depth falling within the range from 3 millimeters to 10 millimeters so as to provide the desired air insulation therebetween while limiting the production of unwanted convection currents that accelerate heat transfer from the tube to the channel section or shield covering the tube. Furthermore, the channel section or shield can, if desired, be made of any low conducting material which functions as additional insulation. However, the air gap feature of this invention enables the use of metal instead of other isolative materials and thus contributes to greater longevity and safer application.

DRAWING DESCRIPTION

In the accompanying drawings which illustrate various aspects and features of this invention:

FIGS. 5 and 6 are similar perspective views of that seen in FIG. 3 but which has attached to the steam distributor tube the two channel sections illustrated in FIG. 4.

Figure 1:
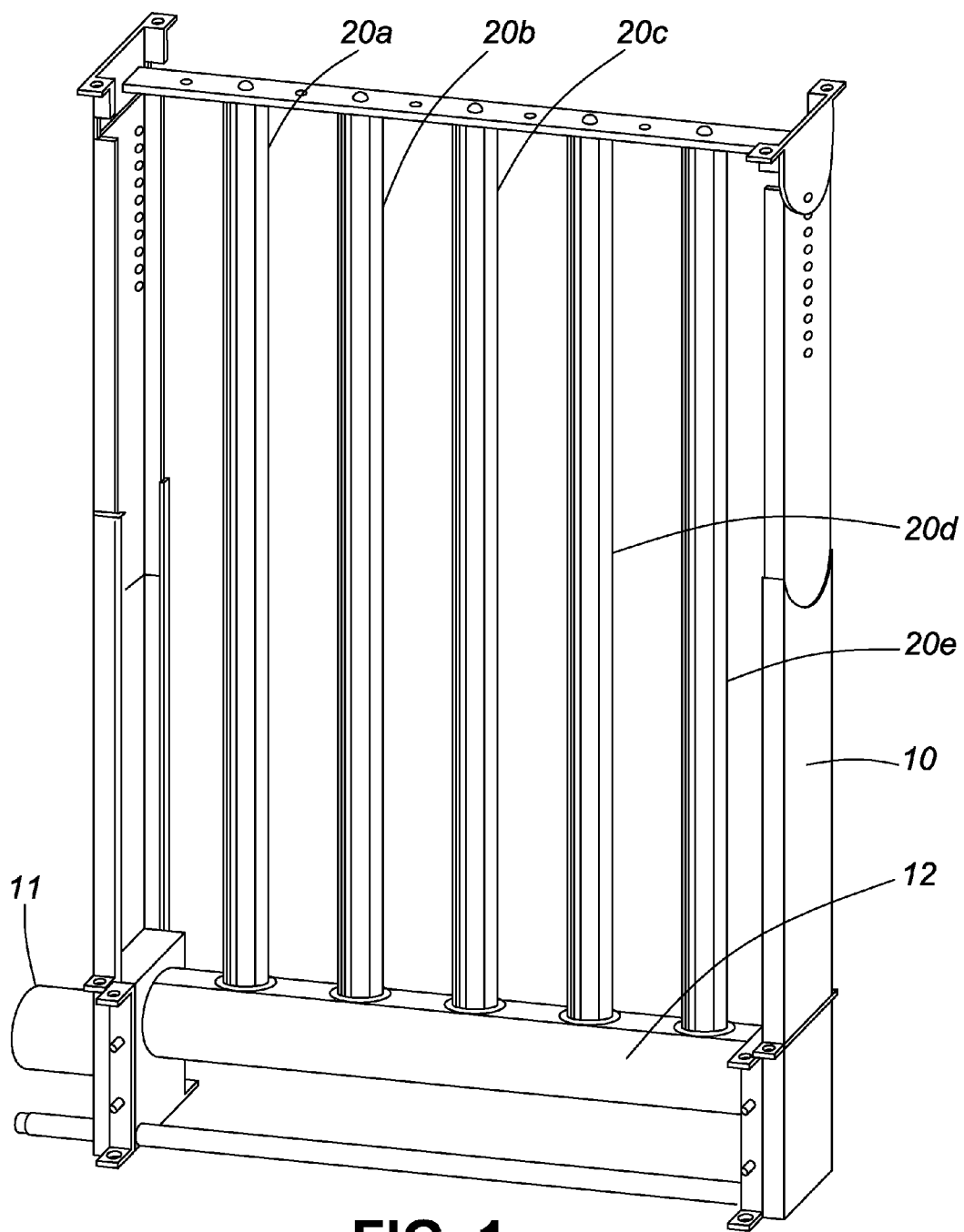
FIG. 1 is a perspective view of five steam discharge tubes clad in thermal shields of this invention which are mounted on a support frame and at one common end are attached to a steam supply manifold.

The steam discharge system seen in FIG. 1 includes supporting framework 10, steam supply tube 11, steam manifold 12, and as illustrated, five steam distribution tubes 20a, 20b, 20c, 20d and 20e all of which have been clad with the novel insulators of this invention.

Figure 2:
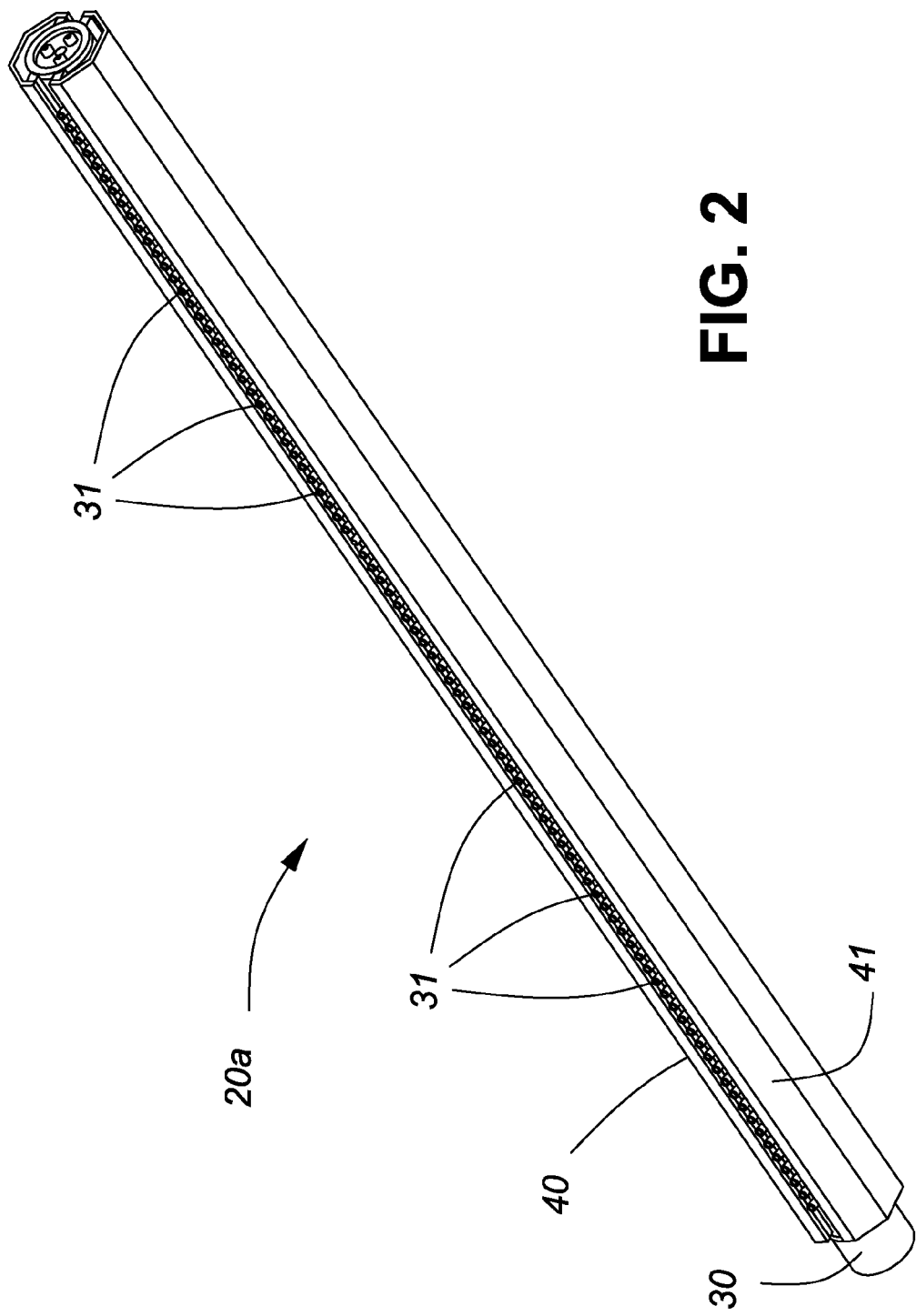
FIG. 2 is a more detailed perspective view of one of the steam distribution tubes illustrated in FIG. 1.

Insulated steam discharge tube 20a is further detailed in FIG. 2 and is made up from interior discharge tube 30 which includes a row of protruding discharge apertures 31 on one side of the tube, with a second parallel row of like apertures located on the opposite side of the tube (not shown).

Figure 3:
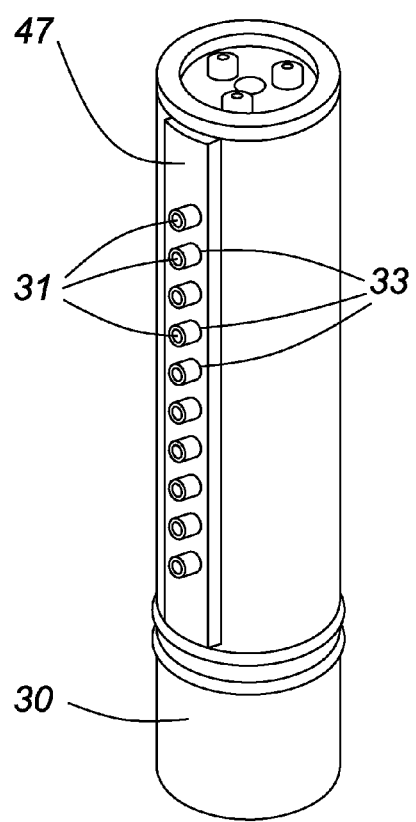
FIG. 3 is a perspective view of a typical steam distribution tube displaying one row of the two rows of steam discharge apertures together with an elongate perforated sealing and spacing strip surrounding the row of apertures.
Figure 4:
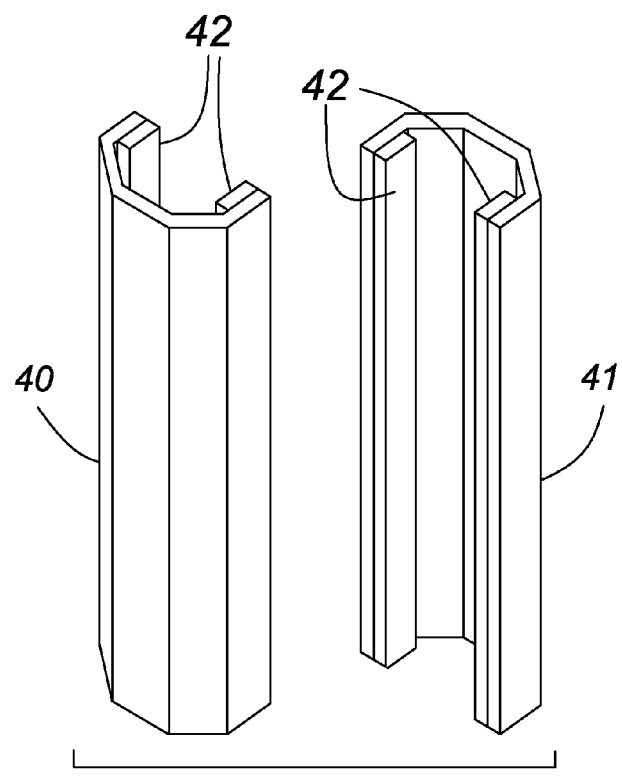
FIG. 4 is a perspective view of opposed channel sections which each have attached interiorly along their longitudinal side edges sealing and spacing strips.

The two elongate channel sections 40 and 41 illustrated in FIGS. 4, 5 and 6, like those of FIG. 3, each have a prismatic profile and are disposed between the two rows of raised and oppositely facing steam discharge apertures.

Referring now to FIGS. 4, 5 and 6, elongate channel sections 40 and 41 each have along their longitudinal side edges, sealing strips 42 which serve to preclude condensate from entering the interior of the elongate channel sections 40 and 41. As best seen in FIGS. 5 through 9, sealing strips 42 also serve to maintain channel sections 40 and 41a predetermined distance from steam discharge tube 30. Optionally, and if desired, strips 42 also can be provided with adhesive on either side thereof so that in addition to their sealing and spacing features, function as the securing means for attaching the channel sections to the steam discharge tube. In its preferred form of assembly, however, the secure attachment of the channel sections or shields 40 and 41 to discharge tube 30 is by the use of two or more tie straps 50 as seen in FIG. 5.

With reference to FIG. 3, rather than affixing strips 42 to the interior of the side edges of the channel sections, the strips can be directly applied and affixed to tube 30 adjacent either side of the row of steam discharge apertures 31 and also the second row on the opposite side (not shown) of the tube. Rather than using two strips on either side of each row, and as seen in FIG. 3, an enlarged strip 47 having a row of perforations 33 extending therethrough and which are dimensioned and spaced apart from one another can be employed so as to extend along and surround each of the steam discharge apertures 31 in each of the two rows.

Figure 7:
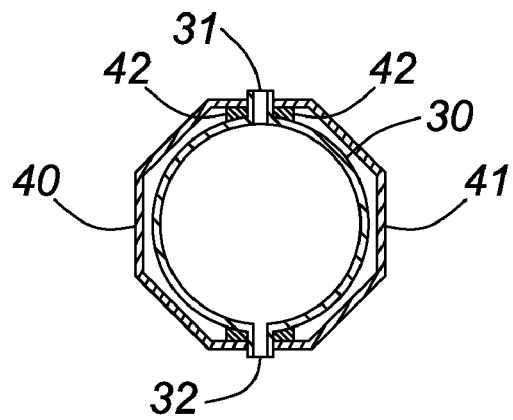
FIGS. 7, 8 and 9 schematically illustrate some of the different profiles the channel sections may take when attached to steam discharge tubes of the type having two parallel rows of oppositely facing steam discharge apertures.
Figure 8:
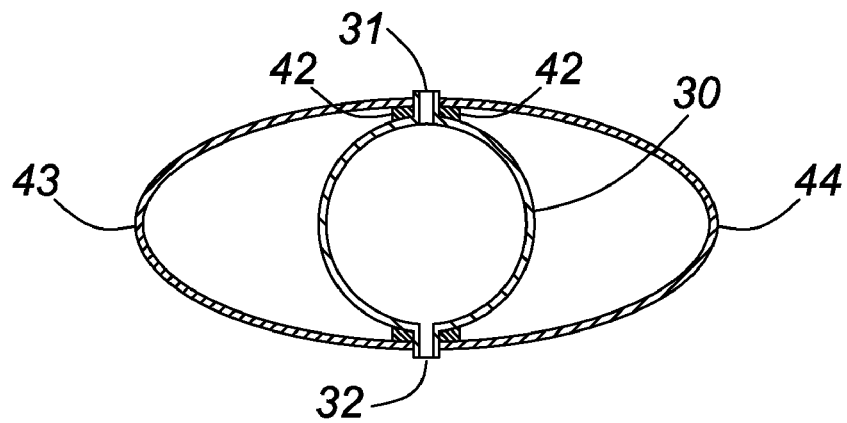
Figure 9:
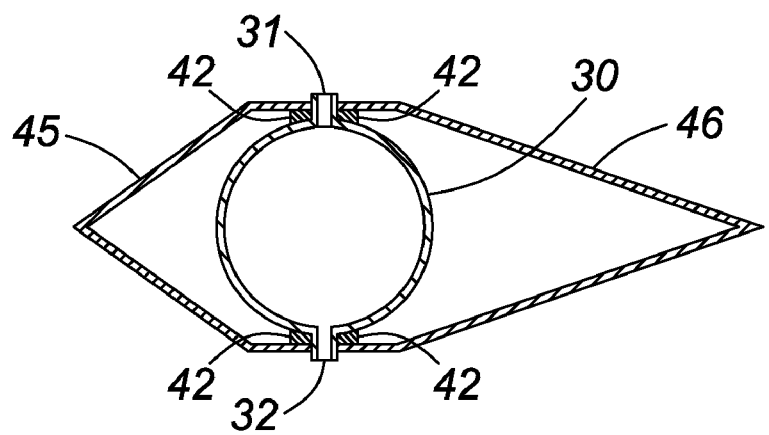

The schematic seen in FIG. 7 relates to the prismatic shaped insulators as seen in FIGS. 1, 2, 5 and 6 which and also illustrates the second row 32 of raised steam discharge apertures. Although it is preferred that the spatial distance between the channel sections and that portion of the steam discharge tube 30 which they envelop be in the range of from 3 millimeters to 10 millimeters, other channel channels profiles are possible without departing from the spirit or scope of this invention, and can include for example, air foil symmetrical profiles 43 and 44 seen in FIG. 8, or non-symmetrical wedge or V-shaped profiles 45 and 46 seen in FIG. 9.

The sealing and spacing strips can be made up from any suitable material that meet environmental regulations, such as PDFT.

What is claimed is:

1. An insulator for use with a steam discharge tube of the type having two parallel rows of oppositely facing steam discharge apertures extending along said tube, said insulator comprising:
   a) two elongate channel sections, each having two elongate channel edges and being dimensioned so as to extend transversely between said two rows and wherein said channel sections extend longitudinally along said tube on opposite sides thereof;
   b) sealing and spacing means comprising two elongate sealing strips attached to the interior of each of said channel sections along said channel edges for sealing in spaced apart relationship an interior of each of said channel sections along said channel edges to respective opposite sides of said tube; and
   c) means for securing said channel sections to said tube when in said sealed and spaced apart relationship.

2. The insulator as claimed in claim 1, wherein the spacing between said channel sections and said tube is from 3 millimeters to 10 millimeters.

3. The insulator as claimed in claim 1, wherein said channel sections are fabricated from any one of stainless steel, aluminum and galvanized steel.

4. The insulator as claimed in claim 1, wherein said channel sections are identical.

5. The insulator as claimed in claim 1, wherein said channel sections in cross-sections are at least one of U-shaped and V-shaped.

6. The insulator as claimed in claim 1, wherein said channel sections in cross-section are arcuate.

7. The insulator as claimed in claim 1, wherein said channel sections in cross-section have prism shaped side walls.

8. An insulator for use with a steam discharge tube of the type having two parallel rows of oppositely facing steam discharge apertures extending along said tube, said insulator comprising:
   a) two elongate channel sections, each having two elongate channel edges and being dimensioned so as to extend transversely between said two rows and wherein said channel sections extend longitudinally along said tube on opposite sides thereof;
   b) sealing and spacing means comprising two elongate sealing strips attached to said tube on adjacent opposite sides of each of said two rows of steam discharge apertures for sealing in spaced apart relationship an interior of each of said channel sections along said channel edges to respective opposite sides of said tube; and
   c) means for securing said channel sections to said tube when in said sealed and spaced apart relationship.

9. The insulator as claimed in claim 8, wherein said channel sections are identical.

10. The insulator as claimed in claim 8, wherein said channel sections in cross-sections are at least one of U-shaped, V-shaped, arcuate, and prism-shaped.

11. An insulator for use with a steam discharge tube of the type having two parallel rows of oppositely facing steam discharge apertures extending along said tube, said insulator comprising:
   a) two elongate channel sections, each having two elongate channel edges and being dimensioned so as to extend transversely between said two rows and wherein said channel sections extend longitudinally along said tube on opposite sides thereof;
   b) sealing and spacing means comprising two elongate sealing strips each having a row of perforations extending therethrough for sealing in spaced apart relationship an interior of each of said channel sections along said channel edges to respective opposite sides of said tube, said perforations being dimensioned and spaced apart from one another so as to extend along and surround the apertures in each of the two said rows of said steam discharge apertures; and
   c) means for securing said channel sections to said tube when in said sealed and spaced apart relationship.

12. The insulator as claimed in claim 11, wherein said channel sections are identical.

13. The insulator as claimed in claim 11, wherein said channel sections in cross-sections are at least one of U-shaped, V-shaped, arcuate, and prism-shaped.

14. An insulator for use with a steam discharge tube of the type having two parallel rows of oppositely facing steam discharge apertures extending along said tube, said insulator comprising:
   a) two elongate channel sections, each having two elongate channel edges and being dimensioned so as to extend transversely between said two rows and wherein said channel sections extend longitudinally along said tube on opposite sides thereof;

b) sealing and spacing means for sealing in spaced apart relationship an interior of each of said channel sections along said channel edges to respective opposite sides of said tube, said securing means includes at least two spaced apart tie down straps which each encircle said channel sections; and c) means for securing said channel sections to said tube when in said sealed and spaced apart relationship.

15. The insulator as claimed in claim 14, wherein said channel sections are identical.

16. The insulator as claimed in claim 14, wherein said channel sections in cross-sections are at least one of U-shaped, V-shaped, arcuate, and prism-shaped.

* * * * *